K. FUKUDA.
ELASTIC TIRE.
APPLICATION FILED DEC. 18, 1919.

1,352,885. Patented Sept. 14, 1920.

Inventor
Kinsuke Fukuda
By his Attorney
Wm Wallace White

UNITED STATES PATENT OFFICE.

KINSUKE FUKUDA, OF TOKYO, JAPAN.

ELASTIC TIRE.

1,352,885. Specification of Letters Patent. Patented Sept. 14, 1920.

Application filed December 18, 1919. Serial No. 345,830.

*To all whom it may concern:*

Be it known that I, KINSUKE FUKUDA, a subject of the Emperor of Japan, residing at No. 3944 Oimachi, Iharagun, Tokyo, Japan, have invented certain new and useful Improvements in and Relating to Elastic Tires, of which the following is a specification.

This invention relates to an improvement in the elastic tire disclosed in Letters Patent No. 1,238,125 dated August 28, 1917. The said patented elastic tire has a solid spongy core which is made of a strip having two or more ridges the surfaces of which are in contact with each other. In this construction, there is considerable friction between the contacting surfaces by reason of the outer shock and in practice the material adjacent to the contacting surfaces becomes melted by the heat produced by the friction and hardens when cooled. Because of this disadvantage the said tire is not suitable for long runs, for the reason that it changes its form and loses its elasticity.

This invention has for its object to eliminate the defect referred to and it is characterized by the insertion into the body forming the core of an inner core made of raw rubber containing no sulfur constituent, between the contacting surfaces of the strip.

Figure 1:
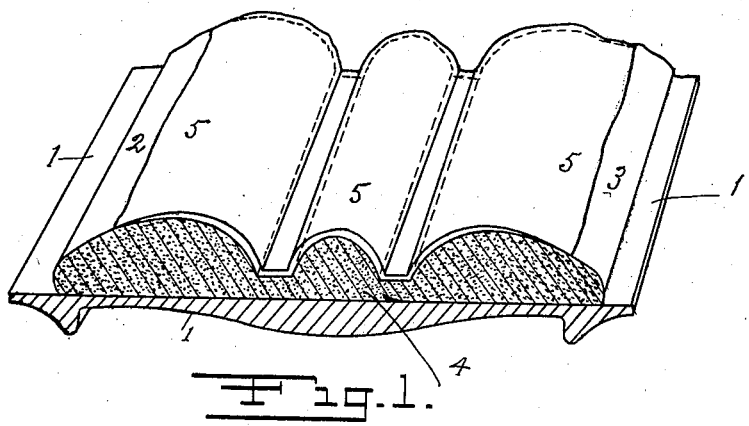
Figure 1 is a perspective view illustrating a development of a part of the tire.

In the drawings, 1 designates the outer casing of the tire. The core of the tire is composed of a strip having three ridges 2, 3 and 4, made of spongy rubber and which strip forms a complete circle in cross section when rolled together.

Figure 2:
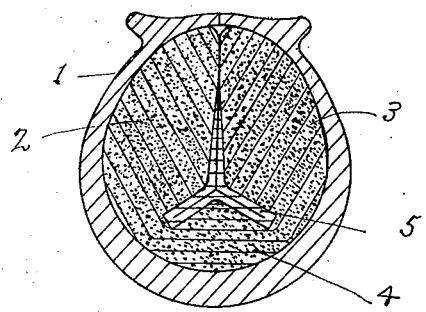
Fig. 2 is a sectional view of the tire.

In Figs. 1 and 2, the surface of the strip is covered by a thin sheet of raw rubber 5, containing no sulfur constituent. When the strip is rolled inside, the raw rubber sheet 5 is positioned between the contacting surfaces of the ridges of the strip.

The raw rubber containing no sulfur constituent has an elasticity identical with that of the compressed spongy rubber and does not lose its elasticity by heat, that is to say, it does not harden when cooled.

As the raw rubber has the above mentioned quality, the core having the inner core of raw rubber as above mentioned, becomes deformed as a result of outer shock so as to form one body, therefore no friction is produced between the contact surfaces of the strip.

If, however, there should be some slight friction between the contacting surfaces of the strip and the inner core, the heat produced by such friction is not sufficient to melt the core, but the latter is merely softened and when cooled it recovers its natural elastic condition and never becomes hardened. Consequently the core forming the subject matter of this invention is capable of long running without changing its form.

The raw rubber may be applied to a suitable fabric and the latter pasted on the surface of the spongy strip.

Figure 3:
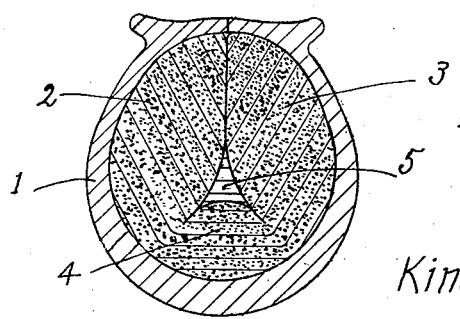
Fig. 3 is a sectional view of a modified form of core.

In the modification shown in Fig. 3, an inner core made of raw rubber and having a suitable form 5 is inserted between the contacting surfaces of the ridges 2, 3 and 4 of the strip, when the strip is rolled. The effect of this modification is the same as that shown in Figs. 1 and 2.

Having now described my invention what I claim is:

1. A core for tires, comprising a strip of spongy rubber having a plurality of ridges adapted to be rolled in contact with each other, and an inner core of rubber containing no sulfur constituent, the inner core being inserted between the contacting surfaces of the ridges when they are rolled.

2. A core for tires, comprising a strip of spongy rubber and a sheet covering the surface of the strip, said sheet consisting of raw rubber containing no sulfur and adapted to be positioned between the contacting surface of the strip when rolled.

3. A core for tires, comprising a strip of spongy rubber having surfaces adapted to be rolled in contact with each other, and a member interposed between such surfaces, said member being formed of a material having an elasticity equal to that of the spongy strip.

In testimony whereof I have hereunto set my hand in presence of two subscribing witnesses.

KINSUKE FUKUDA.

Witnesses:
A. KUSABA,
W. A. GALLAWAY.